United States Patent Office 3,321,630
Patented May 23, 1967

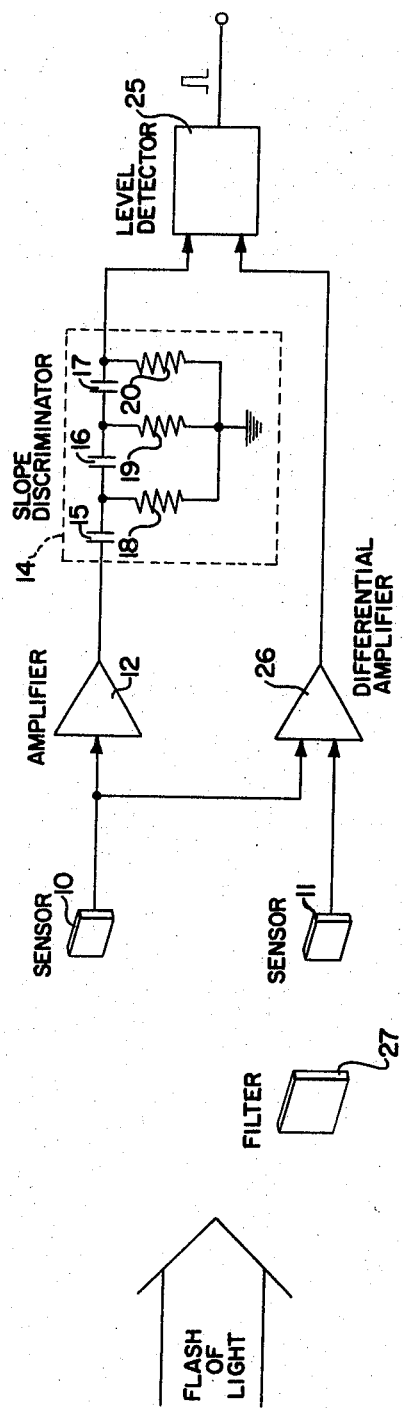

---

3,321,630
SYSTEM FOR THE DETECTION OF HIGH
INTENSITY LIGHT FLASHES
Richard F. Durig, Ralph C. Willett, and Robert D. Collins, Dayton, Ohio, assignors to The National Cash Register Company, Dayton, Ohio, a corporation of Maryland
Filed May 28, 1963, Ser. No. 283,787
3 Claims. (Cl. 250—209)

The present invention relates to systems for the detection of high-intensity light flashes and, more specifically, to a novel system of this type which is sensitive to both the rate of change of the level of intensity and absolute levels of intensity.

There are many applications in which it may be desirable to detect flashes of light in the presence of high levels of ambient illumination. This is particularly true when it is necessary to obtain instrumentation data as early as possible during the period when the intensity of the flash is increasing and when it is mandatory that eye protection against blinding flashes, such as optical lasers, be provided.

Therefore, the requirement of a sensitive, reliable, and extremely high-speed light detection system which may initiate the operation of monitoring equipment or eye protective devices, upon the occurrence of a flash of light, is apparent.

It is, therefore, an object of this invention to provide an improved system for the detection of high-intensity flashes of light.

It is another object of this invention to provide an improved system for the detection of high-intensity flashes of light which is sensitive to both the rate of increase of the level of intensity and absolute levels of intensity.

In accordance with this invention, an improved system for the detection of high-intensity flashes of light is provided wherein, in the presence of a flash of light, the rate of the rise of a potential produced by a photovoltaic sensor device is detected and the degree of slope represented by an analog potential signal and the difference between potentials produced by this sensor and a second similar filtered photovoltaic sensor is amplified as a difference potential signal and both these signals are impressed upon a level detector which is arranged to produce an output signal when either the degree of slope signal or the amplified difference potential signal reaches a predetermined magnitude.

For a better understanding of the present invention, together with additional objects, advantages, and features thereof, reference is made to the following description and accompanying drawing, in which a preferred embodiment is schematically set forth.

To produce the necessary operating signals in the presence of a high-intensity flash of light, two photovoltaic sensor devices 10 and 11 may be used. Devices of this type, when illuminated, produce an electrical potential, the magnitude of which is proportional to the level of illumination, and are commercially available from a variety of sources. It is to be specifically understood, however, that other types of detector devices may be employed without departing from the spirit of this invention.

Upon the illumination of the sensors 10 and 11, each device produces an electrical potential which increases in magnitude as the level of light intensity increases. The output from the sensor 10 is directed through a conventional amplifier 12, which is shown in block form in the drawing, as this device may be any one of many amplifier units well known in the art. The purpose of the amplifier 12 is to increase the output of the sensor 10 to a more operable magnitude.

To produce a degree of slope signal having an amplitude proportional to the rate of rise of the potential developed by the sensor 10, which is, of course, proportional to the increase of intensity of the flash of light, a slope discriminator 14 is employed. This slope discriminator is composed of three resistance-capacitance differentiating networks in series and includes the series capacitors 15, 16, and 17 in combination with respective associated shunt resistors 18, 19, and 20.

High-frequency signals may be translated through this circuitry with little attenuation; however, as the frequency of the signal decreases, the greater is the attenuation of the signal by this network. Zero frequency or direct current signals are, of course, attenuated one hundred percent. Ideally, a network of this type will pass signals of a frequency higher than a determined value with little or no attenuation and will completely attenuate signals of a frequency below this value. It has been found that the arrangement shown herein provides a circuit which approaches this ideal, in that a very sharp knee or break-off occurs in the attenuation characteristic curve at the frequency selected by adjusting the values of the resistors and capacitors.

The rate of rise or the degree of slope of the potential produced by the sensor 10 upon illumination by a flash is a function of frequency. Therefore, if the rate of rise of this signal is of a value which represents a frequency greater than that selected in the design of the slope discriminator, it is passed therethrough with little or no attenuation and appears at the output thereof as a differentiated potential signal pulse having an amplitude approaching the amplitude of the potential appearing at the output of the amplifier 12. If the rate of rise of this signal is of a value which represents a frequency less than that selected in the design of the slope discriminator, it is greatly attenuated by this network and appears at the output as a very low amplitude signal pulse. In this manner, the degree of slope of the signal produced by the sensor 10 upon illumination is represented as an analog signal pulse at the output of the slope discriminator 14.

To produce an output signal when a degree of slope signal of sufficient magnitude appears at the output of the slope discriminator 14, a level detector 25 is used. This device may be of any one of several designs well known in the art and has, therefore, been herein indicated in block form. It is necessary that the circuitry be adjusted to be sensitive only to signals of a potential magnitude greater than that selected and no others. When this device senses a potential signal equal to or greater than this predetermined value, it produces an output signal which may be applied to any suitable utilization circuitry. As there is a wide variety of applications for this device, this utilization circuitry has not been shown in the drawing.

The circuitry just described is sensitive only to flashes of light which increase to maximum brilliance in a very short time, and is insensitive to flashes of light which may build up to the same degree of brilliance over a larger period of time, because this circuitry detects only rate of change. Therefore, to provide a universal detector of this type, it is necessary to also detect certain light flashes which build up to maximum brilliance more slowly.

To do this, another photovoltaic sensor device 11 is employed, and the difference between the potential produced by the sensor 10 and the sensor 11 is amplified in a conventional differential amplifier 26. This difference in potentials produced by the sensor 10 and the sensor 11 can be achieved in any well-known, conventional manner, as for example by utilizing sensors having different response characteristics, or by associating load resistors of different values with the two sensors. As diffeerntial amplifiers are well known in the art and are commercially available from many sources, the amplifier 26 has been herein indicated in block form. It is only necessary that this device amplify the difference between the potentials produced by the sensor 10 and the sensor 11.

As the flash intensity increases, the differential amplifier 26 output increases until the threshold of the level detector 25 is reached by this amplified difference potential signal. Amplitude detection of the flash is considerably facilitated by providing an optical spectral filter 27 for one of the sensors, if the spectral characteristics of the flash are known. This allows detection of the flash at a lower level of amplitude with respect to ambient illumination levels because of the resulting increase in differential input to the amplifier, as between the sensor having the filter and the sensor not having the filter. Also, an optical filter may be used with both sensors if the spectral characteristics of the flash are known. Similarly, one optical filter may be used with the sensor 10 instead of the sensor 11, if desired.

The use of a system combining the characteristics of the units shown in the figure will provide detection of high-intensity flashes under all conditions of flash rise time and high-intensity illumination. For fast rise time flashes, the slope detector will indicate the presence of a flash within a few microseconds. For slow rise time, high intensity flashes, the amplitude detection system will indicate the presence of a flash when the illumination level reaches a predetermined value. Both circuits wil provide flash discrimination under conditions of varying ambient illumination.

While a preferred embodiment of the present invention has been shown and described, it will be obvious to those skilled in the art that various modifications and substitutions may be made without departing from the spirit of the invention, which is to be limited only within the scope of the appended claims.

What is claimed is:

1. A system for the detection of high intensity light flashes comprising a first and a second sensor device each arranged to receive light from sources external of the system, and each of the type which, when illuminated by light, will produce an electrical potential signal of a magnitude which is proportional to the level of intensity of the illuminating light, first means for amplifying said electrical potential signal produced by the first one of said sensor devices, a slope discriminator means for producing a degree of slope signal having an amplitude proportional to the rate of rise of said electrical potential signal produced by said first sensor device, means for applying said electrical potential signal from said amplifying means to said slope discriminator means, second means for amplifying the difference between the said electrical potential signals produced by each of said sensor devices and producing an amplified difference potential signal, electrical circuit means for applying the said electrical potential signals produced by each of said sensor devices to said second amplifying means, and a level detector means sensitive to potential magnitudes of a selected level for producing an output signal in response to the application thereto of either said degree of slope signal or said amplified difference potential signal of sufficient magnitude to exceed said selected level.

2. A system for the detection of high intensity light flashes comprising a first and a second sensor device each arranged to receive light from sources external of the system, and each of the type which, when illuminated by light, will produce an electrical potential signal of a magnitude which is proportional to the level of intensity of the illuminating light, an optical filter means associated with at least one of said sensor devices, means for amplifying said electrical potential signal produced by the first one of said sensor devices, a slope discriminator means for producing a degree of slope signal having an amplitude proportional to the rate of rise of said electrical potential signal produced by said first sensor device, means for applying said electrical potential signal from said amplifying means to said slope discriminator means, differential amplifier means for amplifying the difference between the said electrical potential signals produced by each of said sensor devices and producing an amplified difference potential signal, electrical circuit means for applying the said electrical potential signals produced by each of said sensor devices to said differential amplifier means, and a level detector means sensitive to potential magnitudes of a selected level for producing an output signal in response to the application thereto of either said degree of slope signal or said amplified difference potential of sufficient magnitude to exceed said selected level.

3. The system described in claim 1 wherein said slope discriminator means comprises at least three (3) shunt resistance-series capacitance networks connected in cascade.

References Cited by the Examiner

UNITED STATES PATENTS

| 2,241,557 | 5/1941 | Nichols | 250—205 X |
| 2,757,317 | 7/1956 | Harlan | 250—214 X |
| 3,244,894 | 4/1966 | Steele et al. | 250—226 X |
| 3,248,549 | 4/1966 | Sanabria | 250—226 X |

RALPH G. NILSON, *Primary Examiner.*

WALTER STOLWEIN, *Examiner.*

M. A. LEAVITT, *Assistant Examiner.*